T. G. STRICKLAND.
COTTON STALK KNOCKER.
APPLICATION FILED OCT. 26, 1912.

1,075,610.

Patented Oct. 14, 1913.

2 SHEETS—SHEET 1.

Witnesses
Chas. L. Griestauer.
A. J. Hind.

Inventor
T. G. Strickland,
By Watson E. Coleman,
Attorney

T. G. STRICKLAND.
COTTON STALK KNOCKER.
APPLICATION FILED OCT. 26, 1912.

1,075,610.

Patented Oct. 14, 1913.

2 SHEETS—SHEET 2.

Witnesses
Chas. L. Griesbauer.
A. I. Hind.

Inventor
T. G. Strickland,
By Watson E. Coleman,
Attorney

COLUMBIA PLANOGRAPH CO., WASHINGTON, D. C.

UNITED STATES PATENT OFFICE.

THEODORE G. STRICKLAND, OF CORDELL, OKLAHOMA.

COTTON-STALK KNOCKER.

1,075,610.

Specification of Letters Patent.

Patented Oct. 14, 1913.

Application filed October 26, 1912. Serial No. 727,998.

*To all whom it may concern:*

Be it known that I, THEODORE G. STRICKLAND, a citizen of the United States, residing at Cordell, in the county of Washita and State of Oklahoma, have invented certain new and useful Improvements in Cotton-Stalk Knockers, of which the following is a specification, reference being had to the accompanying drawings.

This invention comprehends certain new and useful improvements in machines for removing cotton stalks, and the invention has for one of its main objects an improved machine of this character which will be capable of accomplishing considerably more work than the ordinary cutting mechanism usually employed for this purpose and with less horse power and in a more efficient manner.

The invention also has for its object a device of this character which will knock or break the stalks and which will include means whereby the knocking or breaking mechanism may be raised or lowered to any desired height above the ground.

The invention has for another object a simple, durable and efficient construction of an apparatus of this character, the parts of which may be cheaply manufactured and readily assembled and installed, and which will require practically no attention to maintain in proper running order and the invention also aims to generally improve this class of devices to render them more useful and commercially desirable.

With the above and other objects in view this invention consists of the novel details of construction, combination and arrangement of parts as will be hereinafter more fully described and particularly pointed out in the appended claim.

In the accompanying drawings has been illustrated a simple and preferred form of the invention it being, however, understood that no limitation is necessarily made to the precise structural details herein exhibited but that the right is reserved to any changes, alterations and modifications to which recourse may be had within the scope of the present invention without departing from the spirit thereof or sacrificing the efficiency of the same.

Figure 1:
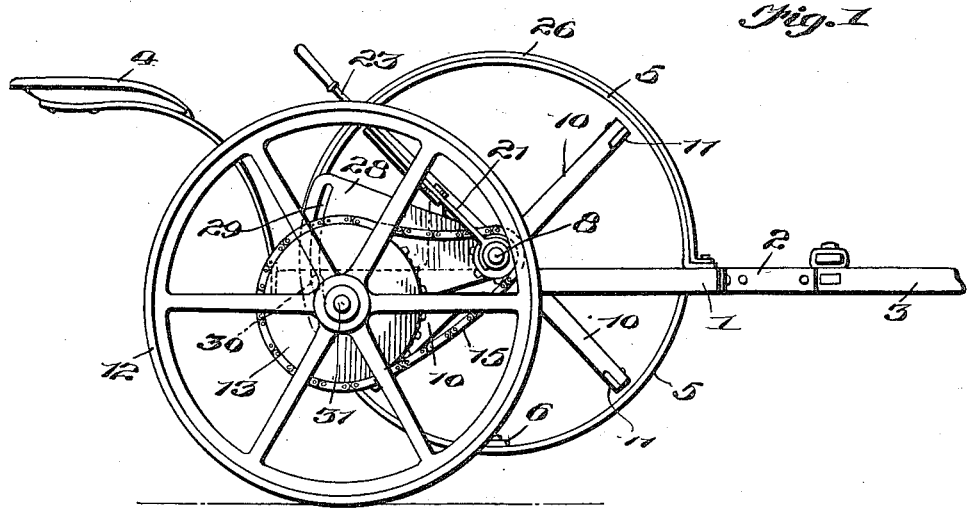
Figure 2:
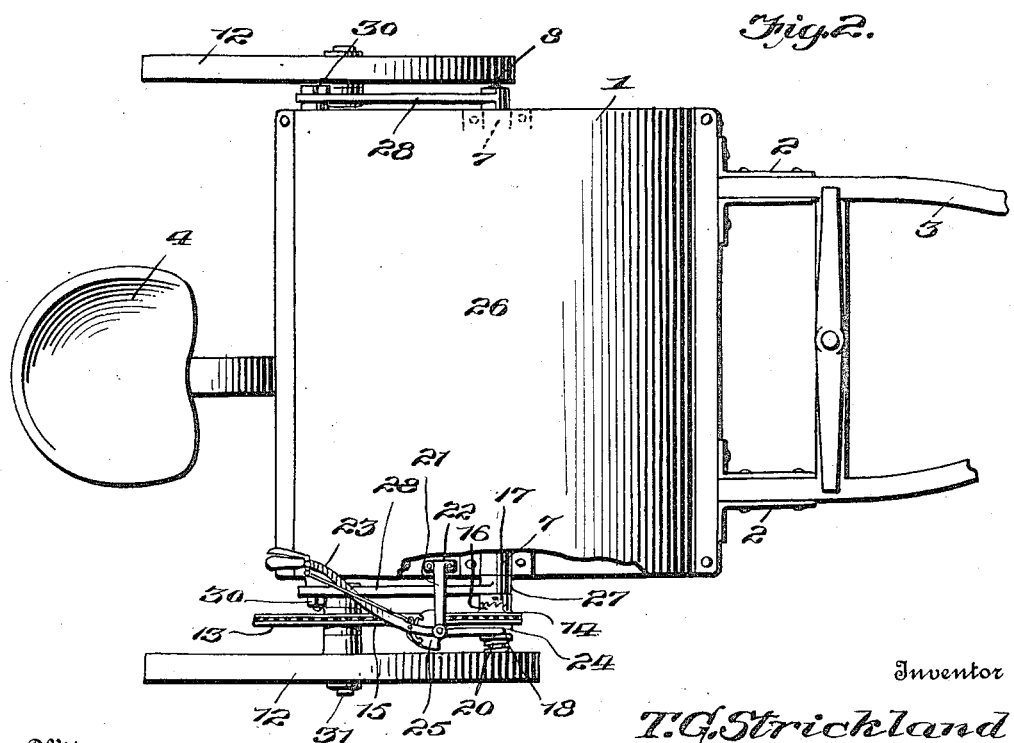
Figure 3:
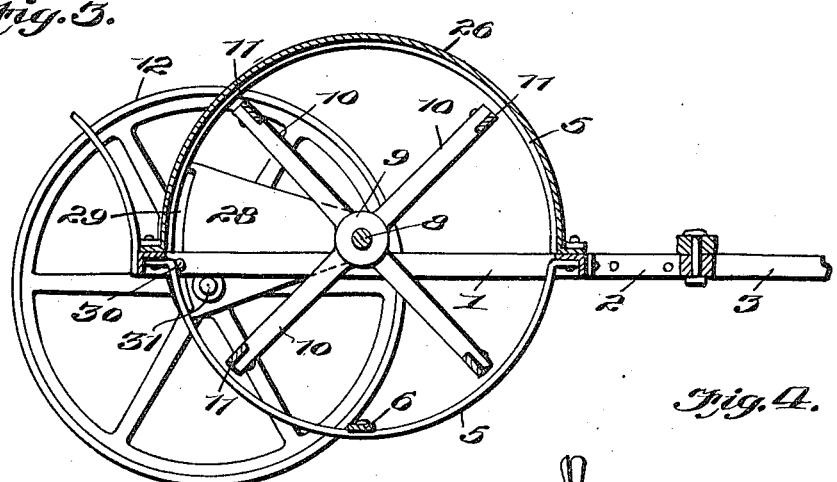
Figure 4:
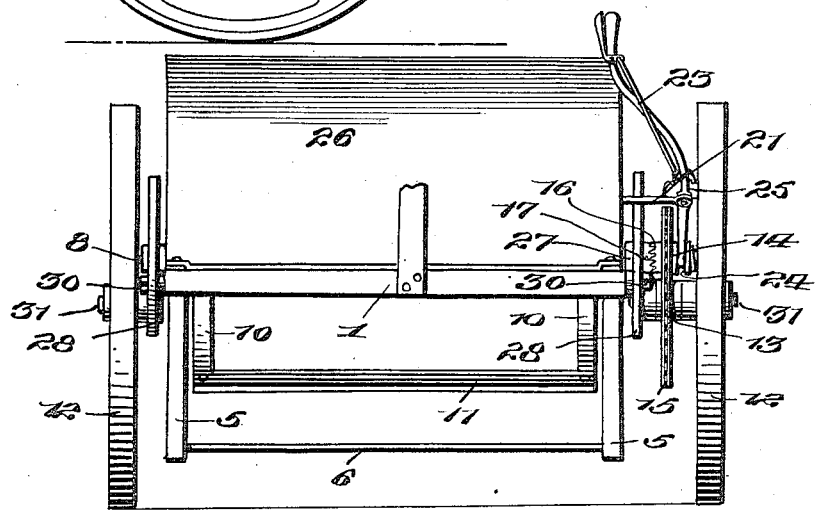
Figure 6:
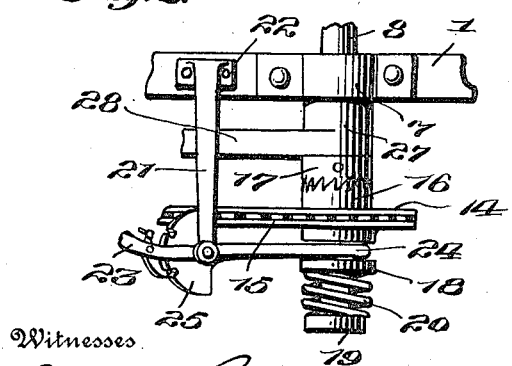
Figure 5:
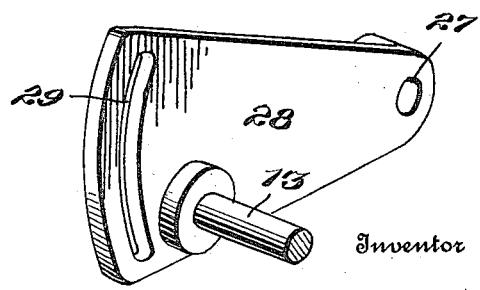

In the accompanying drawings Figure 1 illustrates a side elevation embodying my invention; Fig. 2 is a top plan view of the same; Fig. 3 is a vertical longitudinal section; Fig. 4 is a rear end elevation, Fig. 5 is a detail perspective view, and Fig. 6 is a detail view of the clutch.

Reference now being had to the accompanying drawings wherein like and corresponding parts are designated by similar characters throughout the several views, the numeral 1 indicates the main supporting frame which is preferably made of angle iron and has secured to the front end thereof by means of brackets 2 the shaft 3 to which a draft animal may be attached for propelling the device over the field. Secured to the rear end of the frame 1 is a driver's seat 4.

Secured to each face of each of the side members of the frame work 1 are semicircular members 5, the depending circular members being connected adjacent their medial portions by means of a transversely extending bar 6. Journaled within bearing boxes 7 carried by the side members of the main frame 1 is a transversely extending shaft 8 having keyed thereupon a pair of spaced hubs 9. Extending radially from these hubs 9 are spokes 10 which are connected adjacent the outer ends thereof by means of transverse bars 11.

A pair of ground supporting wheels 12 are carried by the main frame 1 one of which has fixed thereto a sprocket wheel 13 which is operatively connected to a sprocket wheel 14 carried by the shaft 8 by means of a sprocket chain 15. This obviously provides means whereby upon propelling the device over the field the ground wheels will impart a rotatory motion to the shaft 8 and which in turn will also cause the blades and spokes carried by the said shaft to rotate at a rapid rate. As the device is propelled over the field the bar 6 carried by the depending semicircular members will rest upon one side of the cotton stalks and upon the rapid rotation of the shaft 8 the bars 11 will contact with the opposite sides of the stalks thereby knocking and breaking the same which will obviously sever the upper portion of the cotton stalks. Whereas I have illustrated means for operatively connecting the shaft 8 with one of the ground wheels it is of course to be understood that the same means may be operatively connected to both of the ground wheels for properly balancing the machine. The sprocket wheel 14 is loosely mounted upon the shaft 6 and has extending therefrom a sleeve 16 having ratchet teeth formed therein for engaging a similar sleeve 17 carried by the shaft 8. The opposite side of the sprocket wheel 14 has extending therefrom a sleeve 18 and interposed between the last mentioned sleeve and a stop 19 carried by the outer extremity of the shaft 8 is a coil spring 20 which normally holds the said clutch members into operative engagement, thereby providing means whereby upon the stopping of the sprocket wheel 14, the shaft 8 may be permitted to rotate by its own momentum and thereby relieve the operating parts from the strains or shocks to which they would otherwise be subjected upon bringing the machine to a sudden standstill. To provide means for holding the clutch members out of engagement so that the device may be propelled over the field without operating the knocking reel I pivotally mount within a bracket 21 carried by the frame work 1 as at 22 a lever 23 being in the available use of the operator. The lower extremity of this lever 23 is provided with a fork extension which is pivotally connected to a ring 24 slidably mounted within a groove carried by the sleeve 18 of the sprocket wheel thereby providing means whereby the clutch members may be thrown out of operative engagement and to provide means for holding the same out of engagement the upper extremity of the said lever is provided with the usual pawl and ratchet attachment illustrated by the numeral 25. A semicircular housing 26 is carried by the semicircular members 5 supported upon the upper face of the main frame work 1 which will obviously protect anything from coming in contact with the knocker reel upon the rotation thereof.

To provide means for raising and lowering the main frame and for connecting the ground wheels thereto I pivotally mount as at 27 upon the shaft 8 a pair of links 28 having formed adjacent the outer extremities thereof segmental slots 29. Extending from each side of the main frame are adjustable bolts 30 which are operatively mounted within said slots and adapted to hold the said links 28 at their adjusted position. Extending from these links and formed integral therewith are axles 31 upon which the ground wheels are journaled.

It is obvious from the foregoing description that upon adjusting the links 28 upon the frame work the knocking reel and frame will be raised and lowered from the ground.

What I claim is:

In a device of the character described, the combination with a main frame, of a stalk knocking reel journaled within said frame, links pivotally connected to each side of said frame, axles extending laterally from said links and formed integral therewith, ground wheels carried by said axles, the free ends of said links having segmental slots formed therein, bolts carried by said main frame and mounted for adjustment within said slots, and means for operatively connecting one of said ground wheels with said reel substantially as described.

In testimony whereof I hereunto affix my signature in the presence of two witnesses.

THEODORE G. STRICKLAND.

Witnesses:
J. A. TAYLOR,
JOHN W. DUERKSEN.

---

Copies of this patent may be obtained for five cents each, by addressing the "Commissioner of Patents, Washington, D. C."